United States Patent [19]

Blinow et al.

[11] 3,942,184
[45] Mar. 2, 1976

[54] MEANS AND METHOD FOR CALIBRATING LIGHT RESPONSIVE EXPOSURE CONTROL SYSTEM

[75] Inventors: Igor Blinow, Millis; Bruce K. Johnson, Andover; George D. Whiteside, Lexington, all of Mass.

[73] Assignee: Polaroid Corporation, Cambridge, Mass.

[22] Filed: Mar. 31, 1975

[21] Appl. No.: 563,694

[52] U.S. Cl. ...................... 354/42; 354/49; 354/59
[51] Int. Cl.² .......................................... G03B 7/08
[58] Field of Search .................. 354/42, 49, 59, 20

[56] References Cited
UNITED STATES PATENTS

| | | | |
|---|---|---|---|
| 3,545,870 | 12/1970 | Burgarella | 354/59 X |
| 3,832,722 | 8/1974 | Douglas | 354/59 X |
| 3,848,985 | 11/1974 | Bennett | 354/42 X |

*Primary Examiner*—L. T. Hix
*Assistant Examiner*—James LaBarre
*Attorney, Agent, or Firm*—Edward S. Roman

[57] ABSTRACT

A light attenuating filter is provided for a light responsive exposure control system in order to facilitate calibration of the exposure control system so that the amount of scene light admitted by the exposure control system during an exposure interval will substantially correspond to a particular film speed. The exposure control system is of the type having a light detector wherein the light attenuating filter is movable into intercepting relation with a select portion of the scene light directed toward the light detecting means. The select intercepted portion of the scene light is determined and fixed during the manufacture of the exposure control system in order to provide the requisite output response from the light detecting means to terminate an exposure interval in time to insure that the amount of scene light admitted during the photographic cycle substantially corresponds to the select film speed.

14 Claims, 6 Drawing Figures

MEANS AND METHOD FOR CALIBRATING LIGHT RESPONSIVE EXPOSURE CONTROL SYSTEM

BACKGROUND OF THE INVENTION

1. Field of the Invention

This invention relates generally to a means for calibrating the light-sensitive exposure control system and more particularly to a means for calibrating a light-sensitive exposure control system to insure that the amount of light actually passed by the camera shutter during a photographic exposure interval corresponds to the amount of light required by a select film of a given speed to achieve a satisfactory exposure.

2. Description of the Prior Art

Exposure control systems of the light-responsive type are well known in the art and have been widely used in cameras of all types including those adapted for use with film of the self-developing type. Such exposure control systems generally incorporate a photosensitive transducer to which scene light is directed through a shutter apparatus in correspondence with the scene light directed to the film plane. There is additionally provided a light integrating and control circuit which integrates the signal received from the phototransducer until the signal reaches a predetermined exposure value at which point the control circuit operates to terminate the exposure interval.

Exposure systems of the same design, however, generally operate to provide different exposures resulting from the cumulative effect of variations within prescribed tolerances of the individual electronic components which make up the photocell transducer, and light integrating and control circuitry. Additional variations in the exposure control between identically designed exposure control systems may result from differences between the actual shutter blade dynamics associated with each exposure control system.

In order to eliminate such exposure differences between identically designed exposure control systems, it is often necessary that each exposure control system be individually calibrated to admit precisely that amount of light to the film plane which is required by a particular film of predetermined speed to achieve a correct exposure. Exposure control systems of the light responsive type have been calibrated in the above manner by inserting different neutral density filters, one at a time, into scene light intercepting relation with respect to the scene light directed to the phototransducer. After each filter is inserted, a photographic exposure cycle is completed until the best filter is found which operates to most closely correlate the exposure to a selected film speed. One commercially available camera calibrated in the above described manner is Polaroid Corporation's SX-70 Camera. Calibrating an exposure control system through the use of discrete filters, however, can be a time consuming and expensive operation due to the difficulty associated with physically removing and replacing each discrete filter element subsequent to each exposure calibration cycle. In addition, the variations in light attenuation to the phototransducer depend upon the number of different filters maintained in stock, thus precise calibration may not be possible unless a substantial number of discrete filters having different light attenuating characteristics are kept in stock.

Therefore it is a primary object of this invention to provide a simple and economical means for calibrating a ligh responsive exposure control system for a photographic apparatus.

It is also an object of this invention to provide a simple and economical means for calibrating a light responsive exposure control system so that the light actually admitted by the exposure control system corresponds to the amount of light required by a film of selected speed to achieve correct exposure.

It is a further object of this invention to provide a unitary calibration filter disposed for movement with respect to a light sensitive exposure control system in a manner permitting calibration of the exposure control system without the use of a plurality of individual discrete filter elements as heretofore required.

Other objects of the invention will in part be obvious and will in part appear hereinafter. The invention accordingly comprises the mechanism and system possessing the construction, combination of elements and arrangement of parts which are exemplified in the following detailed disclosure.

SUMMARY OF THE INVENTION

The calibrated exposure control means of this invention admits a select amount of light corresponding to a select film speed scene light a photographic exposure interval. The exposure control means is adapted for use with a camera of the type having a housing and an objective lens mounted on the housing and defining a film plane. The exposure control apparatus comprises a wall member together with means for detecting scene light incident thereon for providing an output response indicative of the scene light intensity so detected. Means are also provided for varying the amount of scene light incident on the film plane and on the light detecting means wherein the scene light varying means is selectively actuable to change from a scene blocking mode to a scene light unblocking mode upon the commencement of an exposure interval. Control circuit means are provided to respond to the output response of the light detecting means during an exposure interval in order to actuate the scene light varying means to change from the scene light unblocking mode back to the scene light blocking mode thereby terminating an exposure interval. A light attenuating filter is also provided together with means for movably connecting the filer with respect to the wall member in order to facilitate the positioning of the filter in intercepting relation with a select portion of the scene light directed toward the light detecting means. The select intercepted portion of the scene light is determined during the manufacture of the exposure control system to provide the requisite output response from the light detecting means for the control circuit to actuate the scene light varying means to terminate an exposure interval in time to insure that the amount of scene light incident to the film plane substantially corresponds to the select film speed. There are also provided means for permanently fixing the position of said light alternating filter with respect to the wall member subsequent to the determination of the select intercepted portion of the scene light.

BRIEF DESCRIPTION OF THE DRAWINGS

The novel features that are considered characteristic of the invention are set forth with particularity in the appended claims. The invention itself, however, both as to its organization and its method of operation, together with other objects and advantages thereof, will be best understood from the following description of the illustrated embodiment or when read in connection with the accompanying drawings or when like members have been employed in the different figures to note the same parts and wherein:

DESCRIPTION OF THE PREFERRED EMBODIMENT

Figure 1:
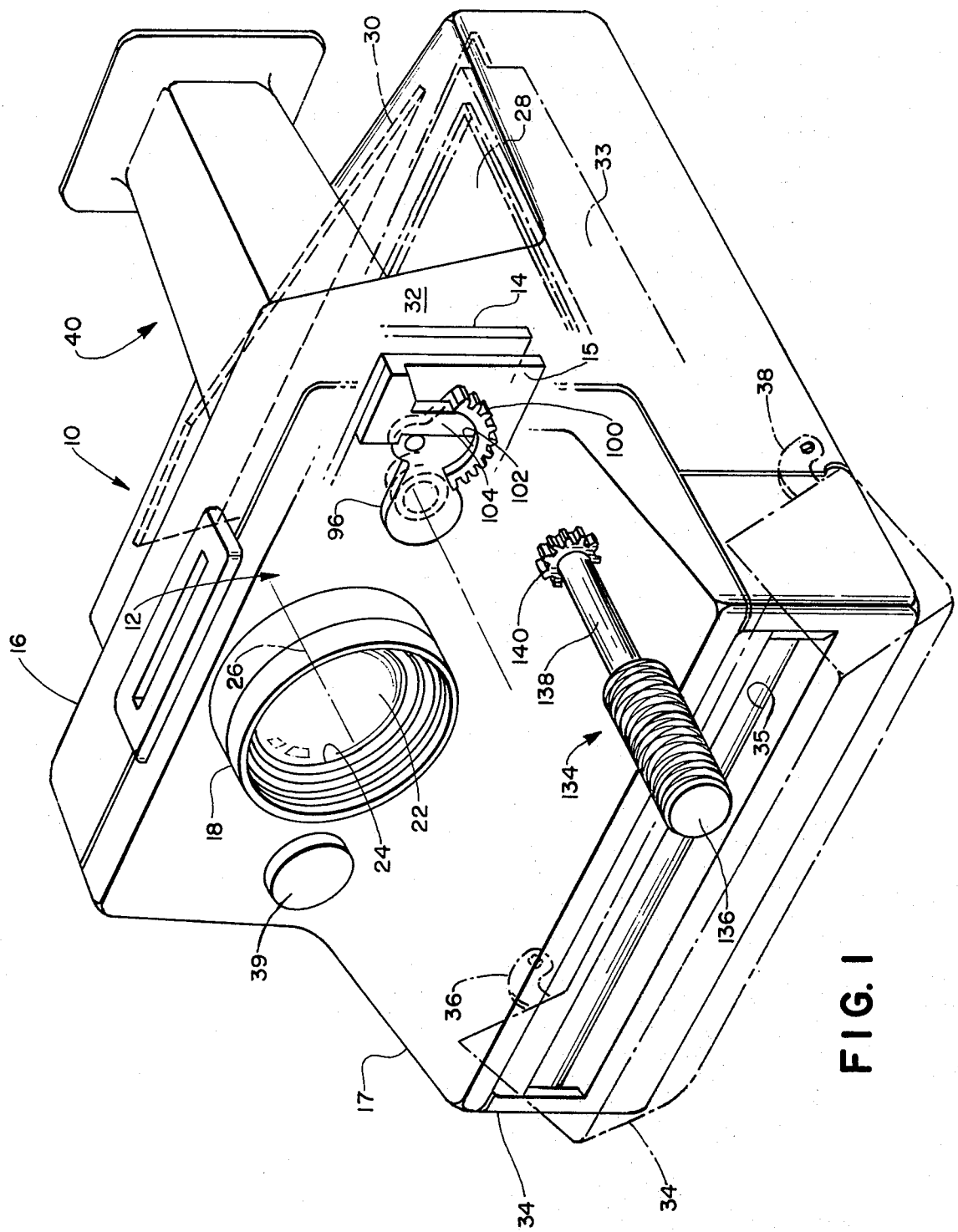
FIG. 1 is a perspective view of a photograhic apparatus embodying the calibration means of this invention.

Referring now to FIG. 1, there is shown a photographic apparatus 10 having an exposure control section 12 which includes a baseblock casting 14 selectively machined to support the components of the exposure control mechanism. Surrounding the baseblock casting 14, there may be provided a housing 16 having a front cover 17 which includes an opening through which protrudes a manually adjustable focus bezel 18. Intermediate the baseblock casting 14 and front cover 17, there is provided a lens housing casting 15, the central portion of which defines a light entering exposure opening 20 which provides the maximum available exposure aperture for the system.

An objective or taking lens 22 is provided in overlying relation to the light entering opening 20 wherein the objective lens 22 may comprise a plurality of elements retained in predetermined spaced relation by a cylindrical lens mount assembly 24 which is externally threaded for toothed engagement with the internally threaded focus bezel 18. Bezel 18 is made rotatable with respect to the lens housing casting 15 to provide translational movement of the elements of lens 22 along a central optical axis 26 of the optical path of the housing 16. As is readily apparent, the center optical axis 26 of the optical path is illustrated as being normal to the plane of the drawings in FIG. 2. The rotation of focus bezel 18 may be carried out by manual rotation to provide displacement of the elements of objective lens 22 for focusing of image-carrying rays through the light entering exposure opening 20. The focused image-carrying rays are directed by way of a reflecting mirror 30 to a horizontally positioned film plane 28 when the system is utilized in conjunction with a suitable film exposure chamber 32. Underlying the film plane 28, there is provided a film assemblage or cassette receiving chamber 33 to which access is provided by a film loading access door 34. The film loading door 34 is pivotally connected with respect to the housing 16 by means of two spaced apart hinges 36 and 38 and thus may be pivoted downwardly with respect to the housing 16 as shown in FIG. 1 to permit insertion of a film cassette or pack into the chamber 33. The loading door is provided with an opening 35 through which each member of a film assemblage is at least partially advanced. Camera alignment with a particular scene about to be photographed is facilitated by a viewfinder shown generally at 40 which may be of any conventional type. Extending from the front cover 17 is a shutter release button 39, the depression of which causes the commencement of an exposure cycle.

Immediately behind the objective lens 22 and light entering exposure opening 20, there are supported two overlapping shutter blade elements 42 and 44 which will be subsequently described in greater detail herein. A pair of scene light admitting primary apertures 43 and 45 are provided respectively in the blade elements 42 and 44 to collectively define a progressive variation of effective aperture openings in accordance with longitudinal and lateral displacement of one blade element with respect to the other blade element in a manner fully described in a U.S. pat. application entitled "Camera with Pivoting Blades", Ser. No. 485,128, by George D. Whiteside, filed July 2, 1974, and assigned in common herewith. The apertures 43 and 45 are selectively shaped so as to overlap the light entering exposure opening 20 thereby defining a gradually varying effective aperture size as a function of the position of blades 42 and 44. Each of the blades 42 and 44 are additionally configured to have corresponding photocell sweep secondary apertures shown respectively at 46 and 48. The secondary apertures 46 and 48 may be configured in correspondence with the shapes of scene lighting primary apertures 43 and 45. As is readily apparent, the secondary apertures 46 and 48 also move in correspondence with the primary apertures 42 and 44 to define a small secondary effective aperture of admitting the passage of light from the scene being photographed to a light detecting station shown generally at 50. The light detecting station 50 includes a photosensitive transducer or photocell 90 which may be either of the photo-voltaic or photoconductive type. The output response of the transducer 90 is directed to a light integrating and control circuit 92 which operates to terminate an exposure interval as a function of the amount of light received through the secondary effective aperture as defined by the overlapping photocell sweep apertures 46 and 48. An exposure control mechanism embodying a light detecting and integrating means of the above described type is shown in more detail and claimed in a U.S. Patent entitled "An Exposure Control System" by V. K. Eloranta, U.S. Pat. No. 3,641,889.

Projecting from the baseblock casting 14 at a location spaced laterally apart from the light entering opening 20 is a pivot point or stud 52 which pivotally and slidingly engates elongate slots 54 and 56 formed in respective shutter blade elements 42 and 44. Pin 52 may be integrally formed with the baseblock casting 14, and blade elements 43 and 45 may be retained in engaging relation with respect to the pin 52 by any suitable means such as peening over the outside end of pin 52.

The opposite ends of the blade elements 43 and 45 respectively include extended portions which pivotally connect to a walking beam 58. The walking beam 58 in turn is disposed for rotation about a laterally extending pin or stud 60 which may also be integrally formed to the baseblock casting 14 at a location spaced laterally apart from the light entering exposure opening 20. The walking beam 58 may be pivotally retained relative to the pin 60 by conventional means such as an E ring 62. The walking beam 58 is also pivotally connected at its distal ends to the shutter blade elements 43 and 45 by respective pin members 66 and 68 which extend from the walking beam 58. Pin members 66 and 68 are preferably circular in cross-section and extend through respective circular openings in respective blade elements 43 and 45 so as to slidably engage respective arcuate slots or tracks 74 and 76 which may be integrally formed within the baseblock casting 14. The arcuate tracks 74 and 76 operate to prohibit disengagement of the blades 43 and 45 from their respective pin members 66 and 68 during exposure control system operation.

A tractive electromagnetic device in the form of a solenoid 78 is employed to displace the shutter blades 43 and 45 with respect to each other and the baseblock casting 14. The solenoid 78 may be of conventional design having an internally disposed cylindrical plunger unit 80 which retracts inwardly into the body of the solenoid upon energization thereof. The solenoid plunger 80 may be affixed to the walking beam 58 by means of a pivot pin or stud 82 such that longitudinal displacement of the plunger 80 will operate to rotate the walking beam around the pivot pin 60 so as to appropriately displace the shutter blades 43 and 45.

Figure 2:
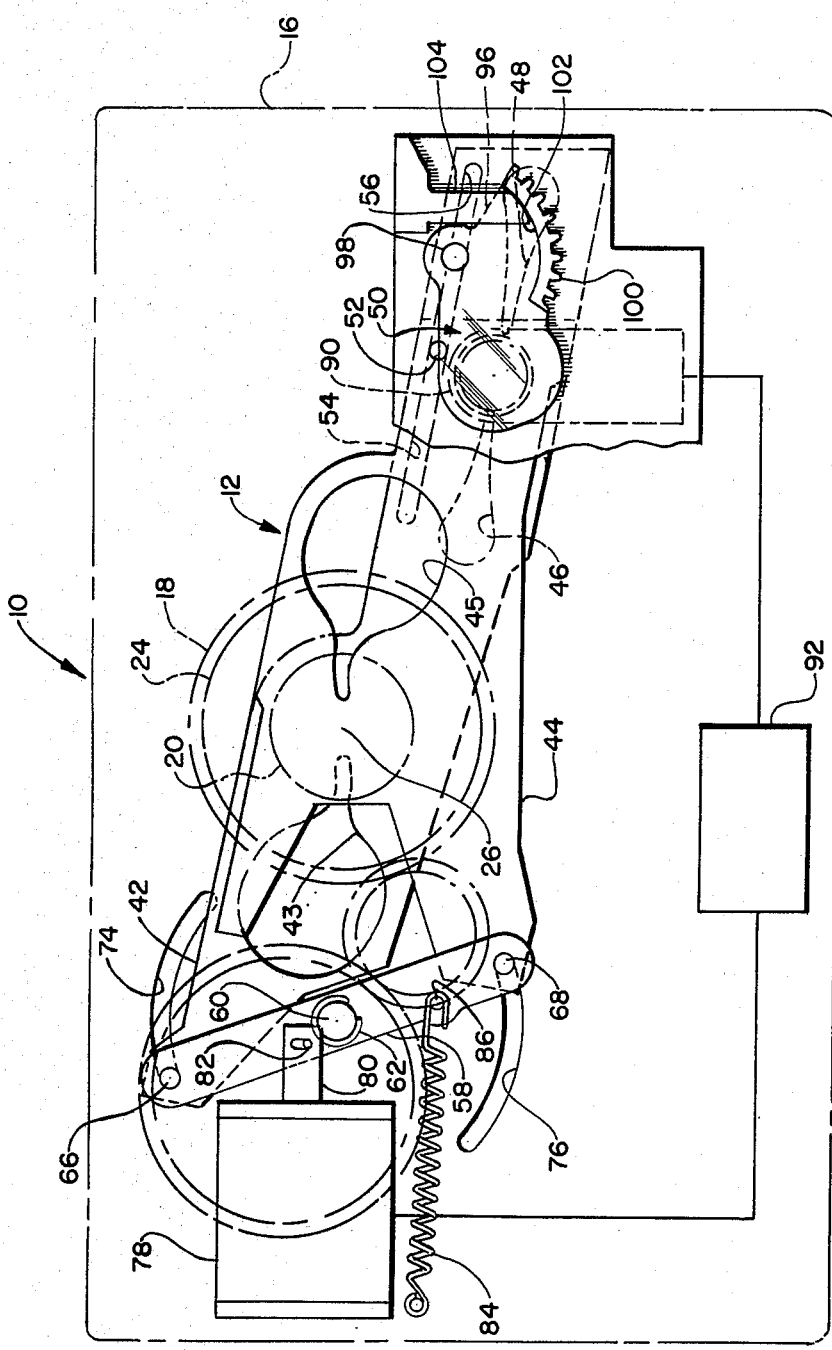
FIG. 2 is a front cutaway view of the exposure control system of the photographic apparatus of FIG. 1 embodying the calibration means of this invention.

The solenoid 78 may be stationed in a position just above a biasing tension spring 84 which operates to continuously urge the shutter blades 43 and 45 into positions defining their largest effective aperture over the light entry exposure opening 20. The movable end of spring 84 is attached to beam 58 at a pin 86 while its stationary end is grounded with respect to the baseblock casting 14. With the spring connection herein described, the exposure control system is biased into a normally open orientation. In the present arrangement, the shutter blades 43 and 45 are drawn to their closed position as shown in FIG. 2 only while the solenoid 78 is energized. Consequently, energization of the solenoid 78 prevents the shutter blades 43 and 45 from moving toward their maximum aperture opening under the urging of spring 84. However, as should be readily understood, the calibration means of this invention would be equally applicable to photographic cameras where the blades 43 and 45 are spring biased in a normally closed position. The calibration means of this invention is also described in relation to a photographic camera of the non-reflex type although the intended scope of the invention is by no means so limited and cameras of the well-known reflex type as described in U.S. Pat. No. 3,672,281 entitled "Reflex Camera" by E. H. Land may be equally suitable for embodying the exposure control system of this invention.

As previously discussed, different cameras of the above described type embodying identical light-sensitive exposure control systems for automatically terminating an exposure interval incur difficulties with regard to correlating the automatic exposure cycle of each camera to the speed of a particular film intended for use with the cameras. The difficulties arise first as a result of the variations in the values of the numerous electronic components which make up the photosensitive transducer 90 and light integrating and control circuit 92, albeit such variations remain within prescribed tolerance limitations. Another source of error results from variations in the shutter blade and walking beam dynamics from one camera to another. Thus, it becomes almost impossible to manufacture a plurality of light-sensitive exposure control systems of identical design which provide the exact exposures required for a particular film speed without, in some manner, individually calibrating each exposure control system. This problem has been solved in the past by inserting a plurality of discrete light attenuating filters, one at a time, in front of the photosensitive transducer 90 and making a calibration exposure cycle for each filter until a particular filter is found which can provide the required exposure. Such discrete filters, however, must be individually removed and replaced prior to each calibration exposure cycle.

Referring now to FIGS. 1 and 2, there is shown a calibration filter 96 comprising a neutral density filter disposed for rotation with respect to the lens housing casting 15 by means of an interconnecting pivot pin member 98. As is readily apparent, the calibration filter 96 may be selectively rotated into that portion of the scene light admitted through the effective aperture as defined by the overlapping photocell sweep apertures 46 and 48 thereby varying the intensity of the scene light incident upon the light detecting means 50. One side of the calibration filter 96 is defined by a raised arcuate edge wall 102 from which extend a plurality of spaced apart teeth 100, the purpose of which will be made apparent from the following discussion. The lens housing casting 15 additionally includes an integral raised elongated finger portion 104 which can overlap the calibration filter 96 during filter rotation. The outer end of the finger portion 104 remains on or in close proximity to the raised arcuate edged wall 102 during filter 96 rotation for reasons which will be made apparent from the following discussion.

Figure 3:
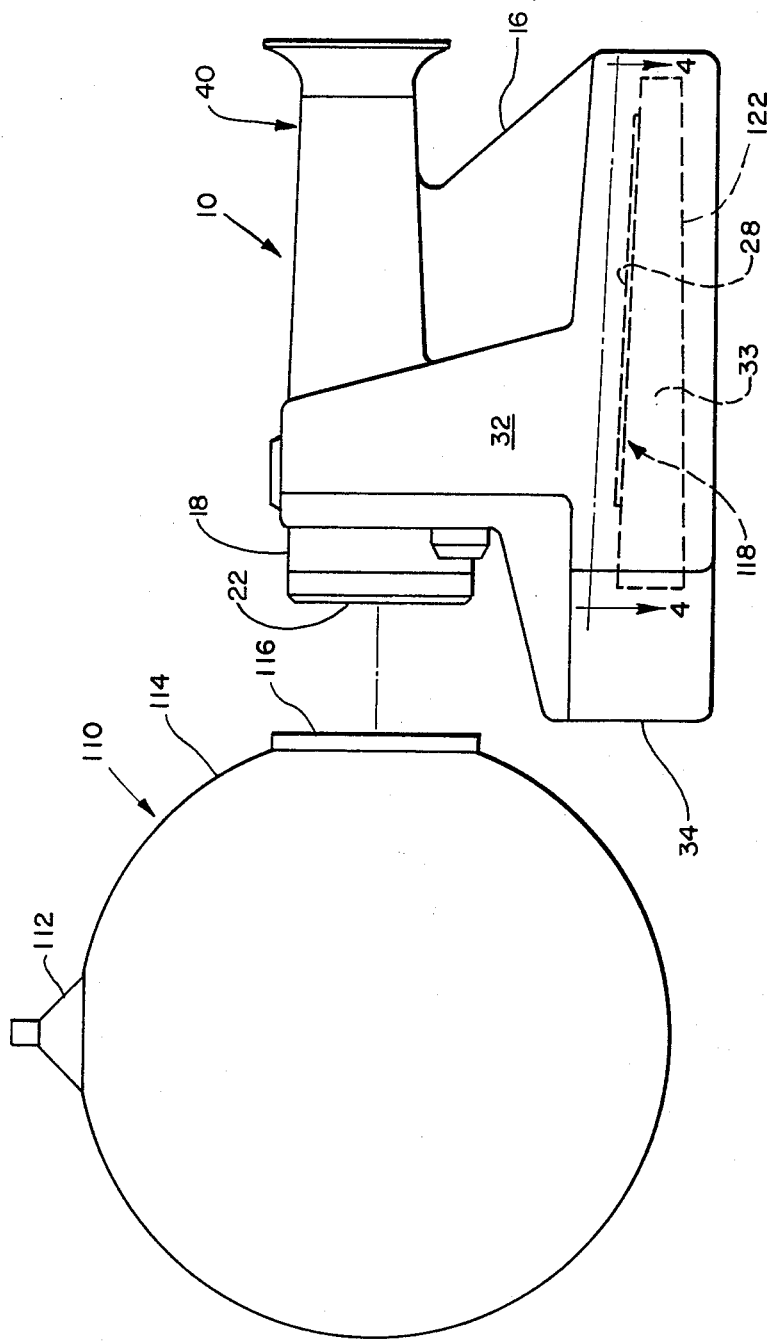
FIG. 3 is a side view of the photographic apparatus of FIG. 1 as stationed with respect to part of the calibration apparatus utilized to calibrate the photographic apparatus of FIG. 1.
Figure 4:
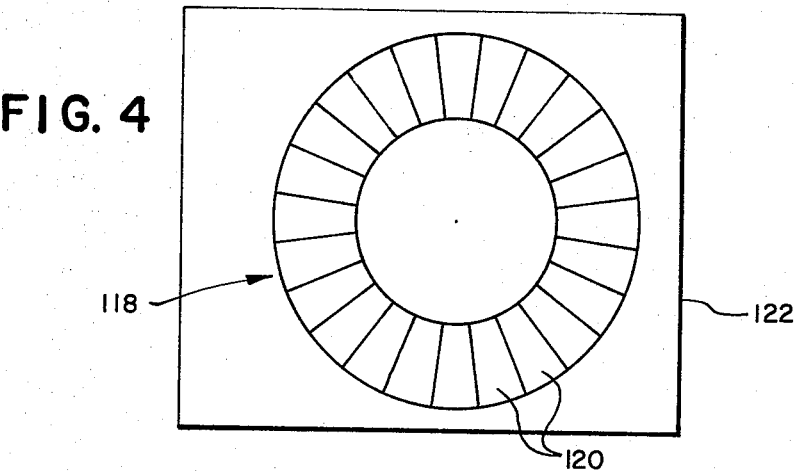
FIG. 4 is a cross-sectional view taken across the lines 4—4 of FIG. 3.
Figure 5A:
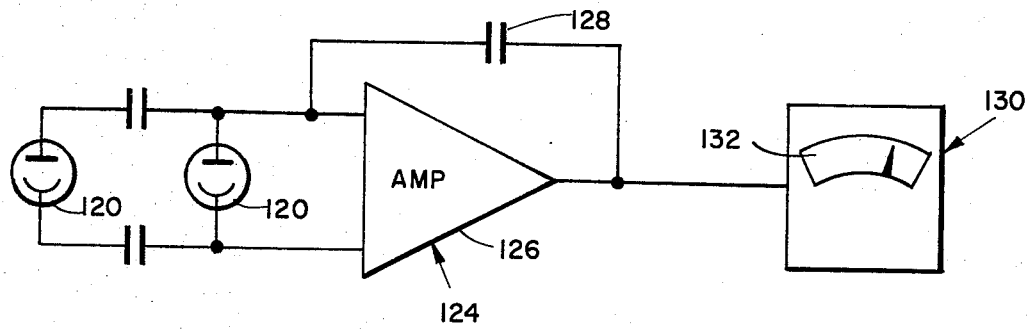
FIG. 5A is a diagrammatic view of another part of the calibration apparatus utilized to calibrate the photographic apparatus of FIG. 1.

Referring now to FIGS. 3–5, there is seen a calibration apparatus used in conjunction with the camera 10 to calibrate the exposure control section 12. The calibration apparatus includes a source of uniform illumination 110 comprising an integrating sphere 114, the interior of which is illuminated by a lamp 112. Light rays of substantially uniform intensity emanate from the source 110 through an opal glass opening 116 which is stationed at a predetermined distance forward of the taking lens 22.

The film loading door 34 must be opened to admit a phototransducer array 118 comprising a plurality of circumferentially spaced apart phototransducers 120 stationed in fixed relation with respect to each other by means of a housing 122 which approximates the size of a conventional film cassette. Thus as is readily apparent, the phototransducers 120 are arranged to lie in the film plane 28 upon insertion of the phototransducers array 118 into the film cassette receiving chamber 33. Phototransducers 120 are connected in parallel relation to provide an output response which may be directed to a light integrating circuit as shown generally at 124 in FIG. 5.

The light integrating circuit 124 is of a conventional type embodying an operational amplifier 126 connected in parallel relation with respect to a feedback capacitor 128. The output signal from the operational amplifier 126 may be connected to a voltmeter 130 having a scale calibrated in a manner to be subsequently described.

The exposure control system may be calibrated to provide an exposure compatible to a particular film speed in the following manner. The speed of the film intended for use for the subject camera apparatus must first be determined. The speed of a film quite simply is an expression of its sensitivity to light and may be measured by giving samples of the film a range of exposures under standard conditions of illumination. The amount of blackening produced after carefully controlled development is measured and plotted (usually logarithmically) against the exposure to provide a characteristic curve. The data obtained from the characteristic curve is then translated into a speed figure to provide the speed of the film tested. This is done by means of a speed formula which defines the speed as a function of the exposure at a specific point of the characteristic curve.

Once a point has been chosen on the characteristic curve for speed determination, there are two basic ways of stating the speed. The simplest of formula is: Speed = Constant Exposure. The exposure is in this case the sensitometric exposure (time × light intensity) corresponding to the selected reference point on the characteristic curve. Such a speed figure is known as an arithmetic speed, because it is inversely proportional to the exposure. Thus under a given set of circumstances a material of twice the speed of another material needs half the exposure of the latter to produce the same image density. The constant in the speed formula is an arbitrary one, chosen to yield speed figures that are convenient to handle. The most easily understood speed formula uses a constant of 1, with the exposure measured in meter-candle-seconds. Thus, for our purposes, the film intended for use for the above described camera apparatus will be considered to have a speed of 0.0725 meter-candle-seconds.

The film speed is thus indicative of the amount of light actually required by the film to achieve a correct exposure. An exposure error results when the actual amount of light passed by the shutter blade elements 43 and 45 to the film plane 28 during an exposure cycle differs from the film speed. Therefore, for our purposes, the term exposure error will relate to the ratio of the amount of light actually passed to the film plane during a photograhic exposure cycle to the amount of light required by a particular film speed to achieve a correct exposure.

Prior to the initiation of a calibrating exposure cycle in accordance with the means of this invention, it may be preferable to rotate the calibration filter 96 to a terminal position of either maximum light attenuation to the photosensitive transducer 90 as shown in FIGS. 1 and 2 or minimum light attenuation wherein the filter 96 is rotated entirely out of light intercepting relation with respect to the transducer 90. Rotation of the calibration filter 96 may be easily accomplished through insertion of a calibration tool as shown generally at 134 wherein the calibration tool 134 comprises a handle 136 from which extends an elongated portion 138 terminating in a circumferentially toothed portion 140. The circumferentially toothed portion 140 is adapted for ready engagement with the arcuately toothed portion 100 so that rotation of the handle 136 about its longitudinal axis operates to rotate the calibration filter 96 about its associated pin member 98.

The lamp 112 is first lighted to provide a source of illumination having substantially uniform intensity about the area of the opal glass 116. Shutter release button 39 may thereafter be depressed to commence an exposure interval during which time the shutter blade elements 43 and 45 initially move in the direction defining a progressively increasing effective aperture so as to progressively increase the amount of light incident to the film plane 28 and the photosensitive transducer 90. The exposure interval is ultimately terminated by the photosensitive transducer 90 receiving a predetermined amount of light upon which the light integrating and control circuit 92 operates to actuate the solenoid 78 to return the shutter blade element 43 and 45 to the light blocking position.

Figure 5B:
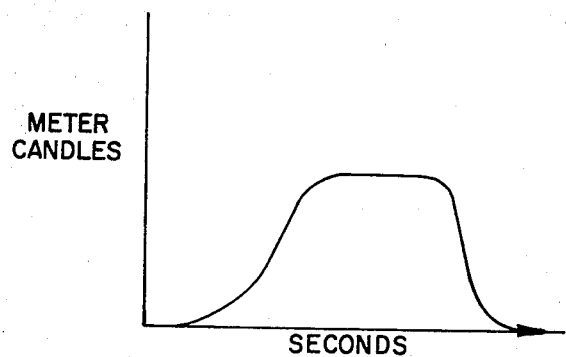
FIG. 5B is a photographic view representative of a changing light intensity during a photograhic interval.

As will be now readily appreciated, the phototransducers 120 also detect the light incident upon the film plane 28 and provide an output signal as shown in FIG. 5B wherein the axis of abscissas is calibrated in terms of seconds with the axis of ordinates calibrated in terms of meter-candles.

The light integrating circuit 124 operates to integrate the output response of the phototransducers 120 and to provide an output response indicative of the total amount of light incident upon the film plane 28. The volt meter 130 may be calibrated to display the amount of light incident upon the film plane in terms of meter-candle-seconds which reading may thereafter be compared with the actual film speed to determine exposure error.

Should the exposure error prove unsatisfactory, the calibration filter 96 may be incrementally rotated a predetermined number of degrees about the pivot pin 98 by the calibration tool 134, after which another calibration cycle may be commenced. The calibration exposure cycle is repeated for each incremental pivotal adjustment of the calibration filter 96 until an acceptable level of exposure error is achieved. It should be readily appreciated that during the calibration procedure, the front cover 17 is not attached in order to permit ready access to the filter teeth 100 by the calibration tool 134. It should additionally be appreciated that each incremental adjustment of the filter 96 operates to change that portion of the scene light intercepted thereby. The volt meter scale 132 may alternatively be calibrated to read out the exposure error directly in terms of "stops" which is the logarithm to the base 2 of the ratio of the amount of light actually passed by the shutter blades to the film plane, to the amount of light required for a particular film speed. Exposure errors expressed in terms of "stops" will be positive for overexposure, 0 for correct exposure, and negative for underexposure. Once the correct position of the calibration filter 96 has been determined, it may be permanently fixed in position by inserting a heating element into proximity with the tip of the elongated finger portion 104 so as to fuse the finger portion directly to the raised arcuate edge wall 102. Of course, it will be appreciated that many alternate means may be used to permanently fix the calibration filter in position.

Thus, the calibration filter herein described provides a simple and economical means for varying the intensity of the scene light incident upon the phototransducer 90 in order to calibrate the output response of the transducer to correspond with a predetermined film speed. That portion of the scene light intercepted by the calibration filter 96 is therefore determined in a manner which provides the requisite output response from the photosensitive transducer 90 for the light integrating and control circuit 92 to terminate an exposure interval in time to insure that the amount of scene light incident to the film plane 28 substantially corresponds to the selected film speed, which for our purposes was set at 0.0725 meter-candle-seconds.

Since certain changes may be made in the above described system and apparatus without departing from the scope of the invention herein involved, it is intended that all the matter contained in the description thereof or shown in the accompanying drawings shall be interpreted as illustrative and not in a limiting sense.

We claim:

1. Exposure control apparatus together with support means therefor for admitting a select amount of light corresponding to a select film speed during a photographic exposure interval wherein the exposure control apparatus may be utilized with a camera of the type having a housing and an objective lens mounted on the housing and defining a film plane, said exposure control apparatus and support means comprising:

a wall member;

means for detecting scene light incident thereon and for providing an output response indicative of the scene light intensity so detected;

scene light varying means for varying the amount of scene light incident on the film plane and on said light detecting means, said scene light varying means being selectively actuable to change from a scene light blocking mode to a scene light unblocking mode upon the commencement of an exposure interval;

control circuit means responsive to the output response of said light detecting means during an exposure interval for actuating said scene light varying means to change from the scene light unblocking mode back to the scene light blocking mode thereby terminating an exposure interval;

a light attenuating filter;

means fo movably connecting said light attenuating filter with respect to said wall member thereby facilitating the positioning of said light attenuating filter in intercepting relation with a select portion of the scene light directed toward said light detecting means, said select intercepted portion of the scene light being determined during the manufacture of said exposure control system to provide the requisite output response from said light detecting means for the control circuit to actuate said scene light varying means to terminate an exposure interval in time to insure that the amount of scene light incident to the film plane substantially corresponds to the select film speed; and means for permanently fixing the position of said light attenuating filter in immovable relation with respect to said wall member subsequent to the determination of said select intercepted portion of the scene light.

2. The exposure control apparatus of claim 1 wherein said permanent fixing means comprises one elongated member extending from said wall member in spaced apart relation thereto, the outward tip of said elongated member being permanently fused to said light attenuating filter.

3. The exposure control apparatus of claim 1 wherein said light attenuating filter is pivotally connected to said wall member and includes a toothed arcuate portion adapted for ready engagement with a toothed calibration tool such that rotation of the calibration tool operates to pivot the light attenuating filter into interception with the scene light directed toward the light detecting means.

4. Exposure control apparatus together with support means for admitting a select amount of light corresponding to a select film speed during a photographic exposure interval wherein the exposure control apparatus may be utilized with a camera of the type having a housing and an objective lens mounted on the housing and defining a film plane, said exposure control apparatus and support means comprising:

a wall member;

means for detecting scene light incident thereon and for providing an output response;

a wall member;

means for detecting scene light incident thereon and for providing an output response;

a blade assembly movable along a predetermined path between a first position wherein it precludes scene light from reaching the film plane and light detecting means and a second position wherein it defines at least one maximum sized aperture which permits a maximum amount of scene light to impinge upon the film plane and light detecting means, said blade assembly serving to define at least one range of progressively increasing sized apertures as it moves from said first position toward said second position upon the commencement of an exposure interval;

selectively actuable means for moving said blade assembly between said first and second positions;

control circuit means for actuating said moving means into moving said blade assembly toward said first position to terminate an exposure interval as a result of the time integration of said output response from said light detecting means reaching a select value;

a light attenuating filter;

means for movably connecting said light attenuating filter with respect to said wall member thereby facilitating the positioning of said light attenuating filter in intercepting relation with a select portion of the scene light directed toward said light detecting means, said select intercepted portion of the scene light being determined during the manufacture of said exposure control system to provide the requisite output response from the light detecting means for the control circuit to actuate said scene light varying means to terminate an exposure interval in time to insure that the amount of scene light incident to the film plane substantially corresponds to the select film speed; and means for permanently fixing the position of said light attenuating filter in immovable relation with respect to said wall member subsequent to the determination of said select intercepted portion of the scene light.

5. The exposure control apparatus of claim 4 wherein said permanent fixing means comprises an elongated member extening from said wall member in spaced apart relation thereto, the outward tip of said elongated member being permanently fused to said light attenuating filter.

6. The exposure control apparatus of claim 5 wherein said light attenuating filter is pivotally connected to said wall member and includes a toothed arcuate portion adapted for ready engagement by a toothed calibration tool such that rotation of the calibration tool operates to pivot the light attenuating filter into interception with that portion of the scene light directed toward the light detecting means.

7. The exposure control apparatus of claim 4 wherein said blade assembly includes at least two blade elements disposed in overlapping sliding relation, said blade elements having respective primary apertures therethrough which cooperatively define a first range of progressively increasing sized apertures upon blade movement from said first position toward said second position thereby varying the amount of scene light incident upon the film plane, together with respective secondary apertures therethrough which cooperatively define a second range of progressively increasing sized apertures in substantial correspondence with said first range thereby varying the amount of scene light incident upon the light detecting means.

8. The exposure control apparatus of claim 7 wherein said blade assembly is movable connected to said wall member and the light attenuating filter is pivotally connected to said wall member and wherein said permanent fixing means comprises an elongated member extending from said wall member in spaced relation thereto to accommodate pivotal movement of said light attenuating filter between said wall member and said spaced apart elongated member, the outward tip of said elongated member being permanently fused to said light attenuating filter.

9. The exposure control apparatus of claim 8 wherein said light attenuating filter is pivotally connected to said wall member and includes a toothed arcuate portion adapted for ready engagement by a toothed calibration tool such that rotation of the calibration tool operates to pivot the light attenuating filter into interception with that portion of the scene light directed toward the light detecting means.

10. A method for calibrating an exposure control system to provide a select amount of light corresponding to a select film speed during a photograhic cycle for a camera of the type including: a housing, an objective lens mounted on the housing, means for defining a film plane within the housing, means for detecting light, selectively actuable means for varying the amount of scene light incident on the film plane and light detecting means during an exposure cycle, control circuit means responsive to the light detecting means for selectively actuating the scene light varying means to terminate an exposure cycle, and a light attenuating calibration filter selectively movable into scene light intercepting relation with respect to the scene light directed toward the light detecting means; said method comprising the steps of:

providing a light source of select illuminationg to illuminate the film plane and light detecting means as a function of the scene light varying means operation during an exposure cycle;

actuating the scene light varying means into an exposure cycle to allow light from the light source to impinge upon the film plane and light detecting means whereupon the control circuit means thereafter actuates the scene light varying means to terminate the exposure cycle as a function of the exposure time and light intensity incident upon the light detecting means;

measuring the light intensity upon the film plane during the exposure cycle;

integrating the measured light intensity at the film plane during the exposure cycle to provide an exposure value;

correlating said exposure value to the speed of a select film; and moving said calibration filter to alter the portion of scene light intercepted by said filter if the exposure value does not correlate to the speed of the select film and then repeating the steps of said calibrating method until said exposure value correlates to the speed of the select film.

11. The method of claim 10 wherein said calibration filter is permanently fixed in position subsequent to the correlation of said exposure value with said select film speed.

12. The method of claim 10 wherein said calibration filter is incrementally moved by way of rotation about a pivot point fixed with respect to said camera housing.

13. The method of claim 12 wherein said calibration filter is incrementally rotated by inserting a calibration too having a circumferentially toothed portion into engagement with an arcuately toothed portion of said calibration filter and thereafter rotating the calibrating tool in a manner operating to rotate said calibrating filter about said pivot point.

14. The method of claim 12 wherein said calbration filter is permanently fixed in position with respect to said pivot point subsequent to the correlation of said exposure value with said select film speed by inserting a heating member adjacent to said calibrating filter and fusing a portion of said calibration filter to a structural portion of said camera.

* * * * *

UNITED STATES PATENT OFFICE
CERTIFICATE OF CORRECTION

Patent No. 3,942,184     Dated August 25, 1976

Inventor(s) Igor Blinow et al.

It is certified that error appears in the above-identified patent and that said Letters Patent are hereby corrected as shown below:

Abstract, line 12, delete "and fixed".

Col. 2, line 1, "ligh" should be --light--.

Col. 2, line 25, "scene light" should be --during--.

Col. 2, line 36, after scene, insert --light--.

Col. 2, line 46, "filer" should be --filter--.

Col. 3, line 20, "photographic" should be --diagrammatic--.

Col. 5, line 23, "60" should be --82--.

Col. 9, line 31, "fo" should be --for--.

Col. 10, lines 4-6, delete lines 4, 5, and 6.

Col. 10, line 52 "extening" should be --extending--.

Col. 11, line 11, "movable" should be --movably--.

Col. 11, line 45, "illuminating" should be --illumination--.

Col. 12, line 11, after "intensity" add --incident--.

UNITED STATES PATENT OFFICE
CERTIFICATE OF CORRECTION

Patent No. 3,942,184      Dated August 25, 1976

Inventor(s) Igor Blinow et al.

It is certified that error appears in the above-identified patent and that said Letters Patent are hereby corrected as shown below:

Col. 12, line 34, "too" should be --tool--.

Col. 12, line 36, "calibrating" should be --calibration--.

Col. 12, line 37, "calibrating" should be --calibration--.

Col. 12, line 43, "calibrating" should be --calibration--.

Signed and Sealed this

Nineteenth Day of October 1976

[SEAL]

Attest:

RUTH C. MASON
*Attesting Officer*

C. MARSHALL DANN
*Commissioner of Patents and Trademarks*